(12) United States Patent
Saito et al.

(10) Patent No.: US 8,488,430 B2
(45) Date of Patent: Jul. 16, 2013

(54) RECORDING MEDIUM AND REPRODUCING APPARATUS

(75) Inventors: Kimihiro Saito, Kanagawa (JP); Yojiro Sumi, Kanagawa (JP); Seiji Kobayashi, Kanagawa (JP)

(73) Assignee: Sony Corportation, Tokyo (JP)

( * ) Notice: Subject to any disclaimer, the term of this patent is extended or adjusted under 35 U.S.C. 154(b) by 0 days.

(21) Appl. No.: 13/333,539

(22) Filed: Dec. 21, 2011

(65) Prior Publication Data

US 2012/0188864 A1 Jul. 26, 2012

(30) Foreign Application Priority Data

Jan. 20, 2011 (JP) .................... 2011-009731

(51) Int. Cl.
*G11B 7/00* (2006.01)
(52) U.S. Cl.
USPC ........................................ 369/103
(58) Field of Classification Search
USPC ............... 369/103, 94, 44.26, 275.3
See application file for complete search history.

(56) References Cited

U.S. PATENT DOCUMENTS 7,505,389 B2 * 3/2009 Nishiwaki et al. ............ 369/103

OTHER PUBLICATIONS

R.R. Mcleod , A.J.Daiber , T.Honda , M.E.McDonald , T.L.Robertson , T.Slagle , S.L.Sochava , and L.Hesselink, "Three-dimensional optical disk data storage via the localized alteration of a format hologram," Applied Optics, vol. 47, May 10, 2008, pp. 2696-2707.
M. Miyamoto, et. al.,"Fabrication of multilayered photochromic memory media using pressure-sensitive adhesives," Applied Optics, vol. 45, No. 33, Nov. 20, 2006, pp. 8424-8427.

* cited by examiner

*Primary Examiner* — Nabil Hindi
(74) *Attorney, Agent, or Firm* — K&L Gates LLP

(57) ABSTRACT

A recording medium includes a photosensitive layer, a nonphotosensitive layer, and a recording layer formation region in which the photosensitive layer and the nonphotosensitive layer are laminated. The photosensitive layer includes a recording layer in which interference fringes formed in parallel with a recording medium surface are deleted or changed within a portion irradiated with focused light to record information or light reflected during irradiation of focused light is used to reproduce information.

6 Claims, 14 Drawing Sheets

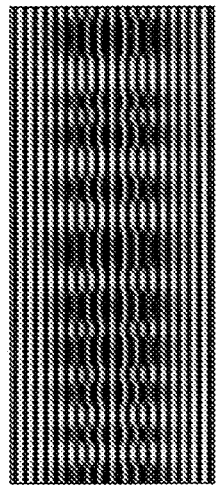
FIG. 4B  TYPE OF REFRACTION INDEX DISTRIBUTION
$\dfrac{P_M}{P_F} > 1$: EXPANSION TYPE
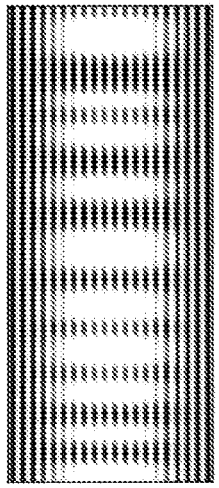
FIG. 4C
$\dfrac{P_M}{P_F} < 1$: SHRINKAGE TYPE
FIG. 4D  DISAPPEARANCE TYPE
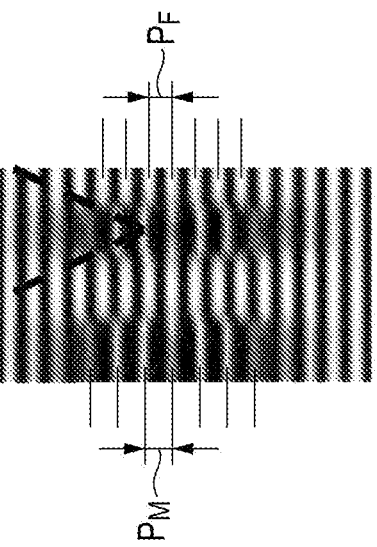
FIG. 4A
RECORDING LIGHT
$P_F$
$P_M$

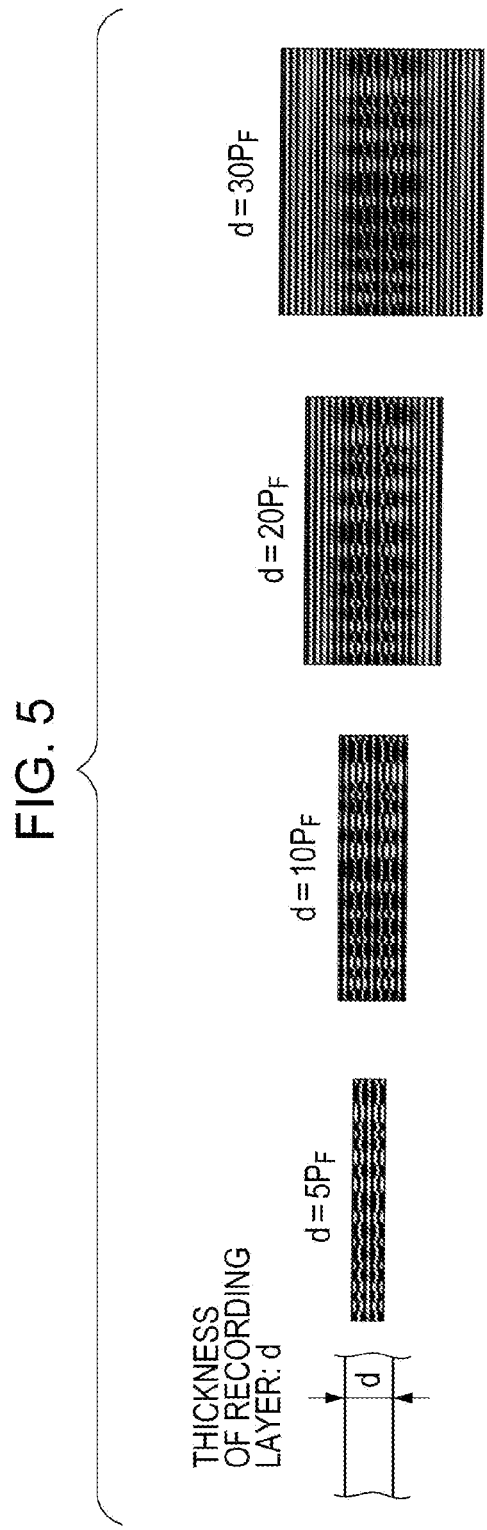

(1,7) RLL MODULATION: 1T = 112 nm, T$_P$ = 0.36 μm
OBJECTIVE LENS: NA 0.85, λr = 405 nm

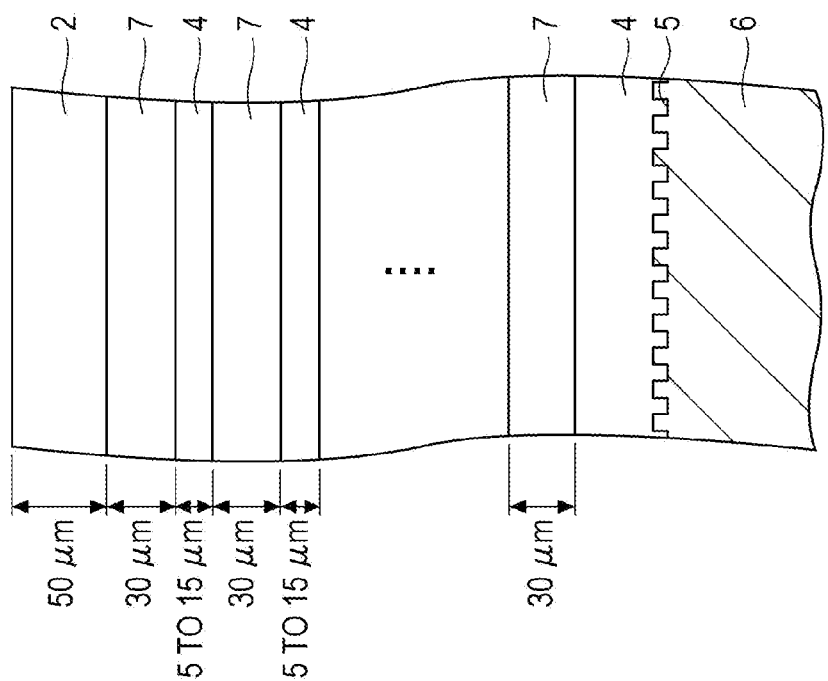
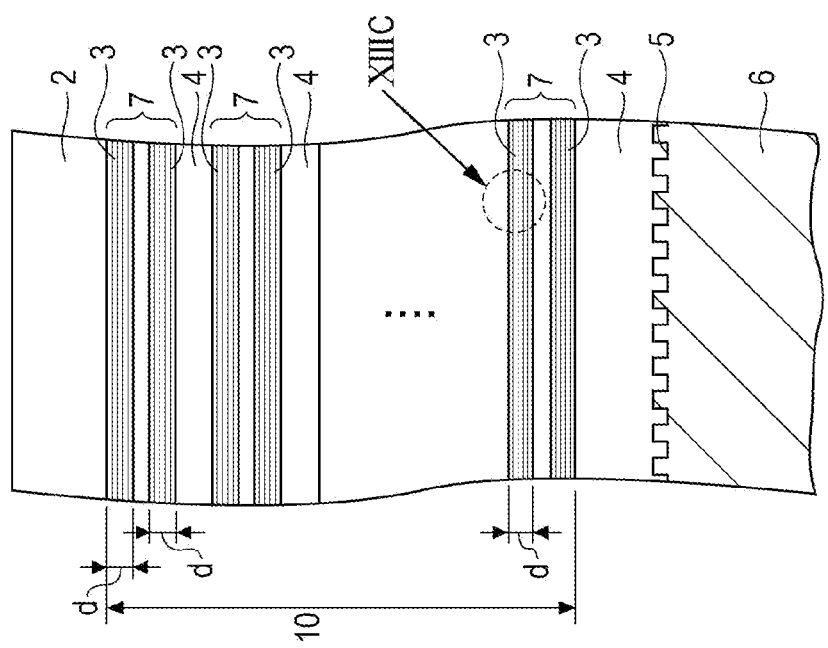
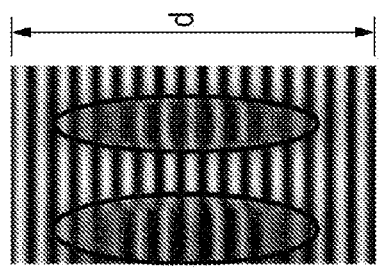

RECORDING MEDIUM AND REPRODUCING APPARATUS

CROSS REFERENCES TO RELATED APPLICATIONS

The present application claims priority to Japanese Priority Patent Application JP 2011-009731 filed in the Japan Patent Office on Jan. 20, 2011, the entire content of which is hereby incorporated by reference.

BACKGROUND

The present application relates to a recording medium including a recording layer in which interference fringes formed in parallel with the surface of the recording medium are deleted or changed within a portion irradiated with focused light to record information or light reflected during irradiation with focused light is used to reproduce information, and a reproducing apparatus for the recording medium.

In optical disc systems such as a CD (compact disc), DVD (digital versatile disc), and BD (blu-ray disc®), minute changes in the reflection coefficient made on one side of a disc are read in a noncontact manner just like the objective lens of a microscope. The size of a light spot on a disc is obtained by λ/NA (λ: wavelength of irradiating light where NA represents a numerical aperture), and the resolution is proportional to this value. For example, a blu-ray disc with a diameter of 12 centimeters has a capacity of approximately 25 gigabytes.

In addition, overlapping a plurality of recording layers increases the capacity of one disc.

On the other hand, a method of recording stationary waves has been proposed.

After light is focused on an inside of a recording medium such as an optical disc whose refraction index depends on the strength of irradiating light, light is focused on the same focal point again from the opposite direction by a reflection apparatus disposed on the backside of the recording medium. This forms a hologram with a small light spot to record information.

During reproduction, information is identified by reading the reflected light of irradiating light from the disc surface similarly. In addition, multi-layer recording is enabled by recording information in a plurality of layers in an optical recording medium.

In this method, however, an optical system should be disposed on each of the upper and lower sides of a recording medium such as an optical disc, so the entire optical system or drive system becomes large and complicated.

A method that records (preformats) interference fringes the entire surface in an optical disc and deletes or changes parts of the interference fringes to record marks is proposed in "Three-dimensional optical disk data storage via the localized alteration of a format hologram", by R. R. Mcleod, A. J. Daiber, T. Honda, M. E. McDonald, T. L. Robertson, T. Slagle, S. L. Sochava, and L. Hesselink, Appl. Opt., Vol. 47 (2008) pp 2696-2707.

A method that records marks by changing the refraction index of the material of a recording layer without creating interference fringes is proposed in "Fabrication of multilayered photochromic memory media using pressure-sensitive adhesives", by Y. Kawata, et. al., Appl. Opt., Vol. 46 (2006) pp 8424.

SUMMARY

The mark recording methods proposed in "Three-dimensional optical disk data storage via the localized alteration of a format hologram" and "Fabrication of multilayered photochromic memory media using pressure-sensitive adhesives" are useful in that optical paths for both sides of a disc are not disposed on a recording-reproducing pickup.

However, this method does not ensure the acquisition of better reproducing signals.

It is desirable to obtain a preferable reproducing signal with a sufficiently high modulation depth in the method that records marks by deleting or changing interference fringes formed in recording medium.

According to an embodiment of the present application, there is provided a recording medium including a photosensitive layer, a nonphotosensitive layer, and a recording layer formation region in which the photosensitive layer and the nonphotosensitive layer are laminated. The photosensitive layer includes a recording layer in which interference fringes formed in parallel with a recording medium surface are deleted or changed within a portion irradiated with focused light to record information or light reflected during irradiation with focused light is used to reproduce information.

The thickness d of the recording layer is equal to or greater than $8P_F$ and equal to or less than $30P_F$ where $P_F$ indicates the pitches of the above interference fringes. More preferably, the thickness d is equal to or greater than $8P_F$ and equal to or less than $22P_F$.

According to an embodiment of the present application, there is provided a reproducing apparatus including an optical pickup that irradiates the recording layer of the recording medium with light and receives reflected light and a signal processor that reproduces information recorded in the recording layer based on information of the reflected light received by the optical pickup.

In the recording medium according to the embodiment of the present application, the photosensitive layers and nonphotosensitive layers are alternately laminated to form interference fringes in which, for example, one photosensitive layer is used as one recording layer. This enables the creation of a multi-layer recording medium including many recording layers. Alternatively, one photosensitive layer may include a plurality of recording layers (interference fringe formation part).

This structure facilitates the creation of a recording medium including a plurality of recording layers in which interference fringes are formed. In addition, when the thickness of the recording layers falls within the above range, a preferable reproducing signal can be obtained from the recording layers.

According to an embodiment of the present application, in the method of recording marks by deleting or changing interference fringes, it is possible to obtain a reproducing signal that has an appropriate signal level and modulation depth during reproduction.

Additional features and advantages are described herein, and will be apparent from the following Detailed Description and the figures.

BRIEF DESCRIPTION OF THE FIGURES

FIGS. 4A to 4D illustrate recording in the hologram disc according to the embodiment.

FIG. 5 illustrates recording marks and the thickness of a recording layer according to the embodiment.

FIGS. 13A to 13C illustrate a hologram disc according to still another embodiment.

DETAILED DESCRIPTION

Embodiments of the present application will now be described in the following order with reference to the figures.
<1. Hologram disc according to an embodiment>
<2. Recording-reproducing apparatus>
<3. Thickness of recording layer>
<4. Hologram disc according to another embodiment>
<5. Hologram disc according to still another embodiment>
<1. Hologram Disc According to an Embodiment>

Figure 1A:
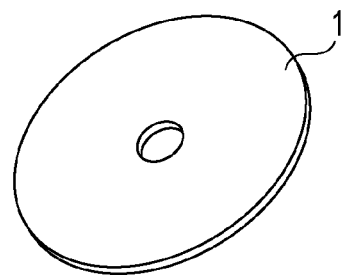
FIGS. 1A and 1B illustrate a hologram disc according to an embodiment.
Figure 1B:
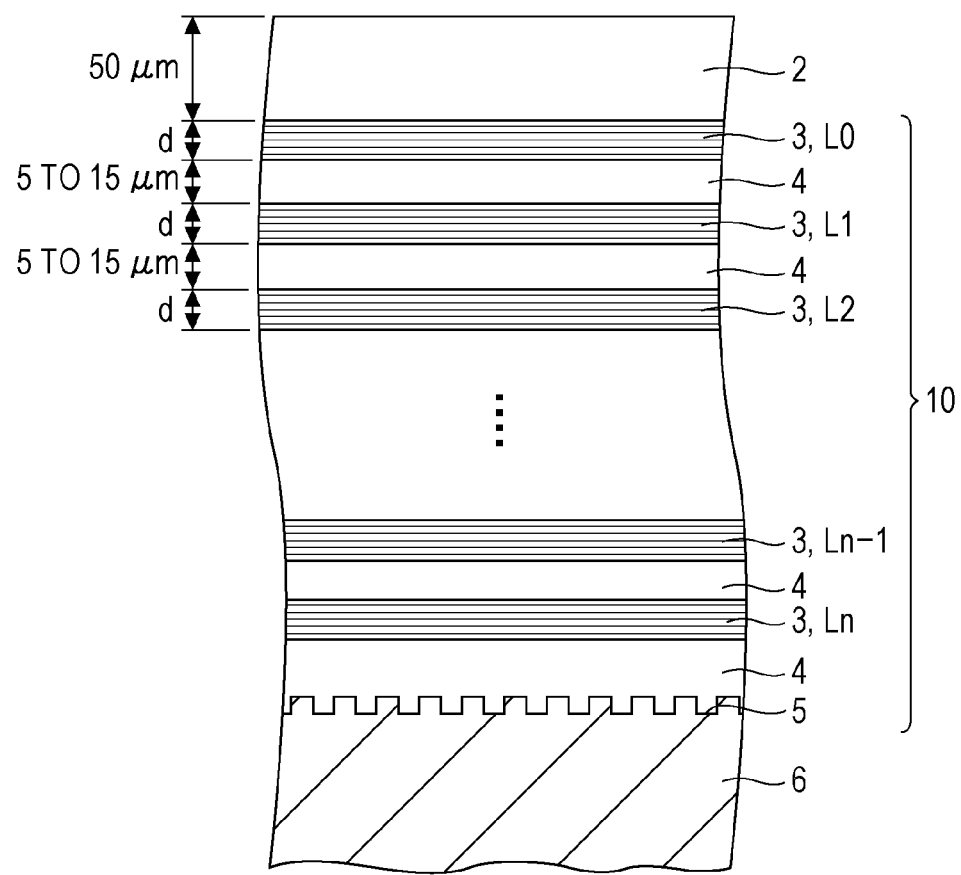

FIGS. 1A and 1B illustrate a hologram disc 1, which is a recording medium according to an embodiment of the present application and its structure.

As shown in FIG. 1A, the hologram disc 1 is a circular disc medium with a predetermined thickness, such as a CD, DVD, or BD.

FIG. 1B shows the sectional structure in the thickness direction of the hologram disc 1.

The hologram disc 1 has a disc substrate 6 on which laminated structure is formed. That is, a recording layer formation region 10 having intermediate layers 4 and recording layers 3 laminated alternately is disposed on the disc substrate 6. A cover layer 2 is formed on the recording layer formation region 10. The cover layer 2 is a surface on which laser light is incident during recording or reproduction.

In the recording layer formation region 10, the intermediate layers 4 and the recording layers 3 are laminated alternately as shown in the drawing.

The recording layer 3 is a photosensitive layer of, for example, photopolymer in which interference fringes have been formed through preformatting described later. The intermediate layers 4 are nonphotosensitive layers of transparent resin material etc. That is, during manufacturing of the hologram disc 1, photosensitive layers and nonphotosensitive layers are laminated alternately on the disc substrate 6 and the cover layer 2 is formed on the top. Then, interference fringes are formed in the photopositive layer through preformatting and the photopositive layer becomes the recording layer 3.

In the embodiment, interference fringes are formed in each photopositive layer in the entire thickness so that one photopositive layer becomes one recording layer 3.

Photosensitive layers and nonphotosensitive layers (intermediate layers 4) are alternately laminated and then interference fringes are formed in the photosensitive layers to form many recording layers 3 (layers L0 to Ln) as shown in the drawing. For example, a 20-layer disc including 20 recording layers 3 or a 30-layer disc including 30 recording layers 3 can be formed.

In this example, a reference plane 5 having a concavoconvex pattern of spiral grooves or concavoconvex pit rows, is disposed in the disc substrate 6. The reference plane 5 is used as the reference for focus servo control of laser light that irradiates the individual recording layers 3 (layers L0 to Ln) or the reference for tracking servo control during recording or reproduction.

Since the concavoconvex pattern of the reference plane 5 includes a wobbling groove wobbled on the basis of address information or pit rows based on address information, it can be also used to read addresses on the disc during recording or reproduction.

The reference plane 5 having a predetermined concavoconvex pattern may be formed in another position such as a position between the cover layer 2 and the recording layer formation region 10.

The cover layer 2 has a thickness of approximately 50 μm, for example.

The intermediate layer 4 (nonphotosensitive layer) has a thickness of approximately 5 to 15 μm.

The thickness of the recording layer 3 (photosensitive layer) is assumed to be d. The thickness d will be described later. When the pitch of interference fringes is $P_F$, d preferably falls within the range from $8P_F$ to $30P_F$, and more preferably the range from $8P_F$ to $22P_F$.

As described above, the hologram disc 1 according to the embodiment has the recording layer formation region 10 in which photosensitive layers and nonphotosensitive layers are laminated alternately. The photosensitive layer has the recording layers 3 in which interference fringes formed in parallel with the recording medium surface are deleted or changed within a portion irradiated with focused light to record information or light reflected during irradiation with focused light is used to reproduce information.

Particularly in the embodiment, interference fringes are formed in the entire thickness of the photosensitive layer so that one photosensitive layer becomes one recording layer 3. The thickness d (which is also thickness of the photosensitive layer) of the recording layer 3 is set within the above range.

As described above, in the hologram disc 1, the recording layers 3 are formed by forming interferences fringes in the photosensitive layer as preformatting.

When information is recorded on the hologram disc 1, irradiation of one side with focused light deletes or changes interference fringes to make mark recording.

Preformatting will now be described below.

Figure 6:
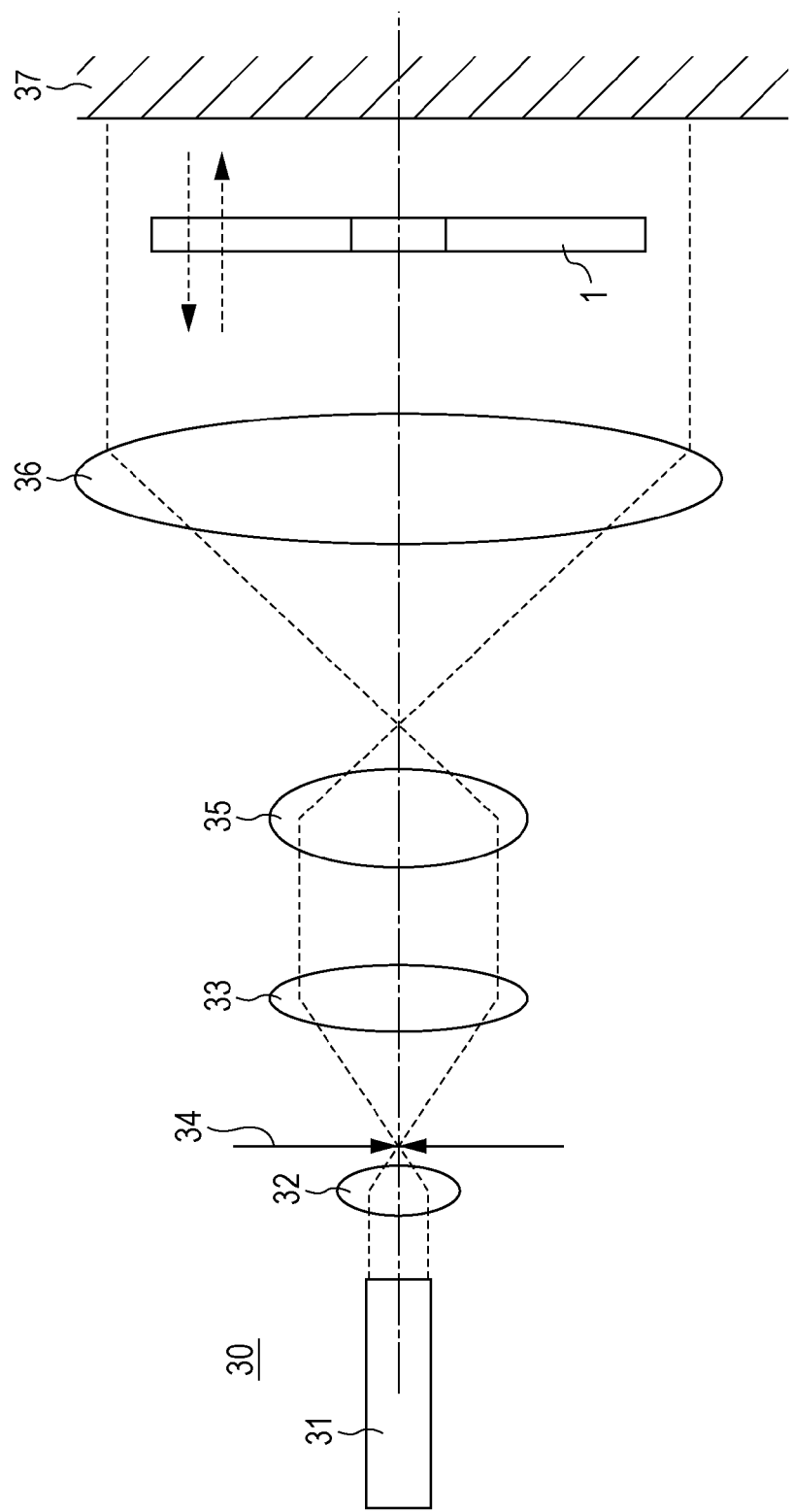
FIG. 6 illustrates a preformatting apparatus for the hologram disc according to the embodiment.

An example of the structure of a preformatting apparatus 30 will be described with reference to the FIG. 6.

A laser light source 31 outputs preformatting light with the wavelength λf. For example, the wavelength λf is assumed to be equal to the wavelength λr, which is the wavelength of reproducing light for the hologram disc 1. For example, λf=λr=405 nm is assumed.

The diameter of the preformatting light is expanded by an expander including lenses 32 and 33. A spatial filter 34 is placed in the focal plane position of the lenses 32 and 33 included in the expander.

The diameter of the preformatting light is further expanded by lenses 35 and 36. Then, one side of the hologram disc 1 is evenly irradiated with the parallel light of a plane wave obtained from the lens 36.

The preformatting light of a plane wave passes through the hologram disc 1 and is reflected by a mirror 37. With this, the other side (opposite side) of the hologram disc 1 is irradiated with the plane wave at the same time.

Accordingly, the preformatting apparatus 30 includes a first irradiation optical system (from the laser light source 31 to the lens 36), which irradiates the individual recording layers 3 of the hologram disc 1 with preformatting light of a plane wave with the wavelength λf vertically from one side and a second irradiation optical system (from the laser light source 31 to the mirror 37), which irradiates the other side of the individual recording layers 3 of the hologram disc 1 with preformatting light of a plane wave with wavelength λf.

This structure of the preformatting apparatus 30 is only an example and another structure is allowed. For example, the second irradiation optical system can be formed using an optical path independent of that of the first irradiation optical system.

Figure 2A:
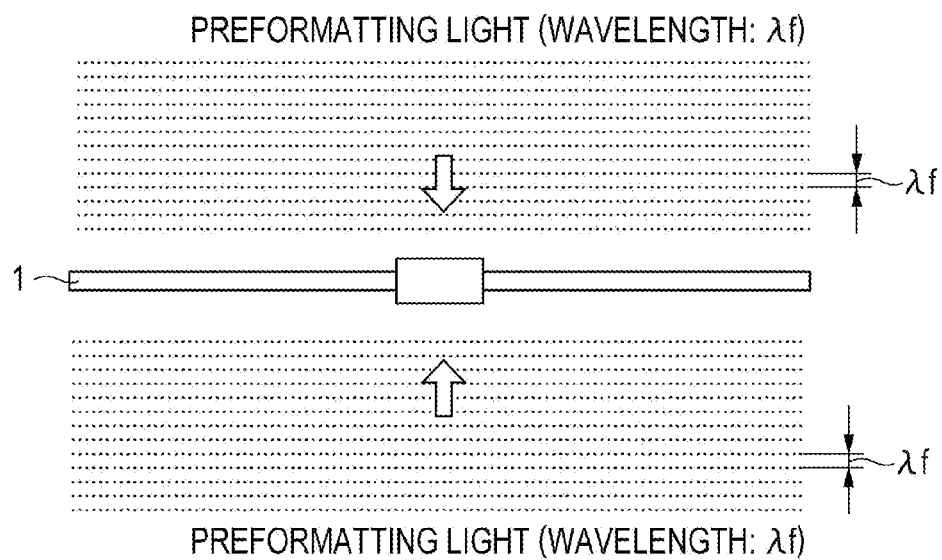
FIGS. 2A and 2B illustrate preformatting by a plane wave according to the embodiment.
Figure 2B:
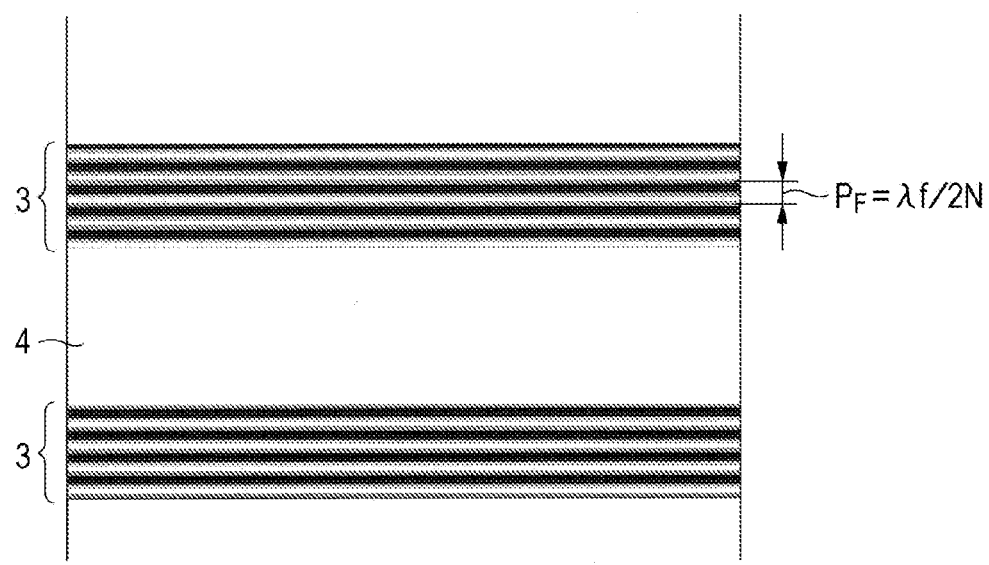

Preformatting by the preformatting apparatus 10 of this type is indicated in FIGS. 2A and 2B.

FIG. 2A schematically shows the even irradiation of one side and the other side of the hologram disc 1 with preformatting light of a plane wave with the wavelength λf using, for example, the preformatting apparatus 30 as described above.

The irradiation of both sides of the hologram disc 1 with a plane wave with the wavelength λf evenly forms planar interference fringes with a pitch of $P_F=\lambda f/2N$ as shown in FIG. 2B as the individual recording layers 3 of the hologram disc 1. Here, N represents the refraction index of the material of the recording layer.

This means the formation of gratings for which the distribution of the refraction index changes in the thickness direction, as the individual recording layers 3 (layers L0 to Ln in FIG. 1B) of the hologram disc 1. These gratings have a base refraction index of N and a refraction index change amount of ΔN.

Since the intermediate layer 4 is a nonphotosensitive layer, no interference fringes are formed. Accordingly, when plane light is incident on the upper and lower sides of the hologram disc 1, interference fringes are formed in all photosensitive layers. That is, if irradiation with preformatting light is performed once, many recording layers 3 are formed.

During recording, one side of the recording layers 3 of the hologram disc 1 in which interference fringes have been formed in this way is irradiated with focused light to form marks.

FIG. 4A shows mark recording performed when the recording layers 3 having interference fringes with pitch $P_F$ in the depth direction (thickness direction) of the hologram disc 1 is irradiated with light.

When recording light is focused on and then irradiates a certain recording layer 3 of the hologram disc 1, interference fringes are deleted or changed (expanded or shrunk) in this portion and marks are formed as shown in the drawing. FIG. 4A shows an example in which interference fringes are expanded in a portion where laser light is focused and pitch $P_M$ of interference fringes after recording became larger than the original pitch $P_F$.

FIGS. 4B, 4C, and 4D show examples of marks assumed to be formed during recording.

FIG. 4B shows an expansion type in which marks are formed with pitch $P_M$ after recording larger than the original pitch $P_F$ of interference fringes of the recording layers 3.

FIG. 4C shows a shrinkage type in which marks are formed with pitch $P_M$ after recording smaller than the original pitch $P_F$ of the interference fringes of the recording layers 3.

FIG. 4D shows a disappearance type in which marks are formed with the interference fringes of the recording layers 3 disappearing.

These types of recording marks are assumed. Which of the expansion, shrinkage, and disappearance types is used can be determined by the settings of the power of recording laser light and the material of the recording layers 3.

FIG. 5 shows an example of forming recording marks when the thickness d of the recording layers 3 varies. FIG. 5 shows recording marks formed when the thickness d of the recording layers 3 is $5P_F$, $10P_F$, $20P_F$, or $30P_F$ for the expansion type.

As described above, marks can be formed in the recording layers 3 by irradiation with recording laser light so that information can be recorded as a row of marks.

During reproduction, reproducing light is focused on and then irradiates the recording layer 3 in which a row of marks was formed. Due to differences in the refraction index between the mark portion (portion where interference fringes transform or disappear) and the portion where the original interference fringes remain as is, the reproducing signal corresponding to the row of marks is obtained when the reflection light of reproducing light is detected.

The hologram disc 1 according to the embodiment has the following advantages.

In the hologram disc 1, photosensitive layers and nonphotosensitive layers are alternately laminated and interference fringes are formed using one photosensitive layer as one recording layer. This facilitates the creation of a multi-layer recording medium including many recording layers 3. In particular, when interference fringes are formed through preformatting, the irradiation with preformatting light as shown in FIG. 2A forms interference fringes only in the individual photosensitive layers, thereby forming a multi-layer recording medium including a plurality of recording layers.

Because of this laminated structure, the thickness of the recording layer 3 can be easily controlled in the laminating process. The thickness of the recording layer 3 is important for obtainment of a favorable reproducing signal.

A method of forming marks with a changing refraction index in recording layers with no interference fringes will be assumed here. For example, it is assumed that a layer structure as shown in FIG. 1B contains no interference fringes in its recording layers and the refraction index of the recording layers is N1 before recording and N1+ΔN after recording.

For example, it is assumed that N1 is 1.6, ΔN is 0.01, and the refraction index N0 of the portion equivalent to the cover layer or intermediate layer is 1.55.

In this case, the reflection coefficient before recording is 0.025%, the reflection coefficient after recording is 0.036%, and the change in the reflection coefficient in the mark recording portion is 0.011%, which is very small. This represents an insufficient S/N ratio as a reproducing signal and makes favorable reproduction difficult.

On the other hand, in the hologram disc 1 in this example, gratings are formed by using hologram recording medium material as the individual recording layers 3. The reflection coefficient can be increased by forming gratings.

The diffraction efficiency is obtained by the following expression.

$$\eta = \tan h^2(\Pi \cdot \Delta N \cdot d/\lambda)$$

Figure 3:
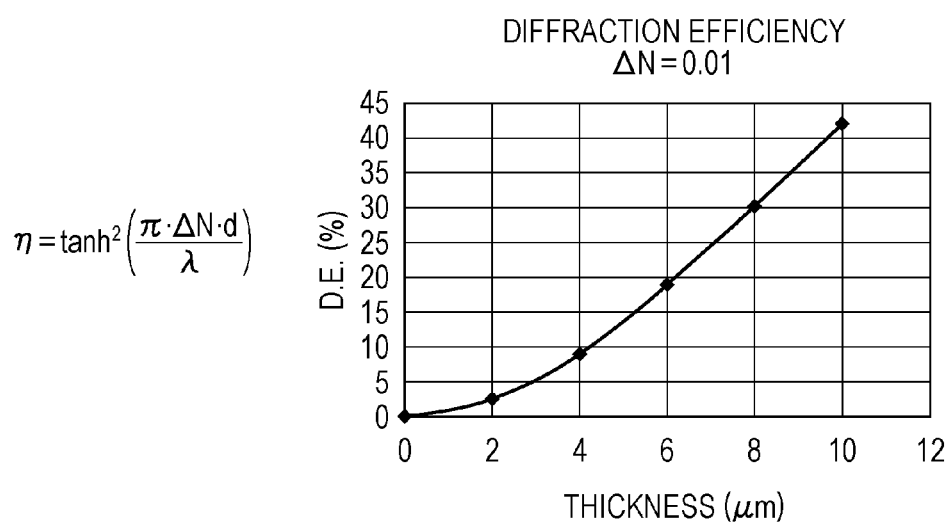
FIG. 3 illustrates the relationship between the thickness and diffraction efficiency of a medium.

FIG. 3 shows a graph with the diffraction efficiency plotted on the vertical axis and the thickness d of a medium plotted on the horizontal axis.

That is, if the thickness of the recording layers 3 is properly set, a sufficient reflection coefficient is obtained and a reproducing signal with a favorable S/N ratio is obtained.

In the embodiment, the thickness d of the recording layers 3 (photosensitive layers) is determined to meet $8P_F \leqq d \leqq 30P_F$, preferably $8P_F \leqq d \leqq 22P_F$, where $P_F$ represents the pitch of interference fringes, in order to obtain a favorable reproducing signal.

The reason for the range of the thickness d will be described later.

<2. Recording-Reproducing Apparatus>

Figure 7:
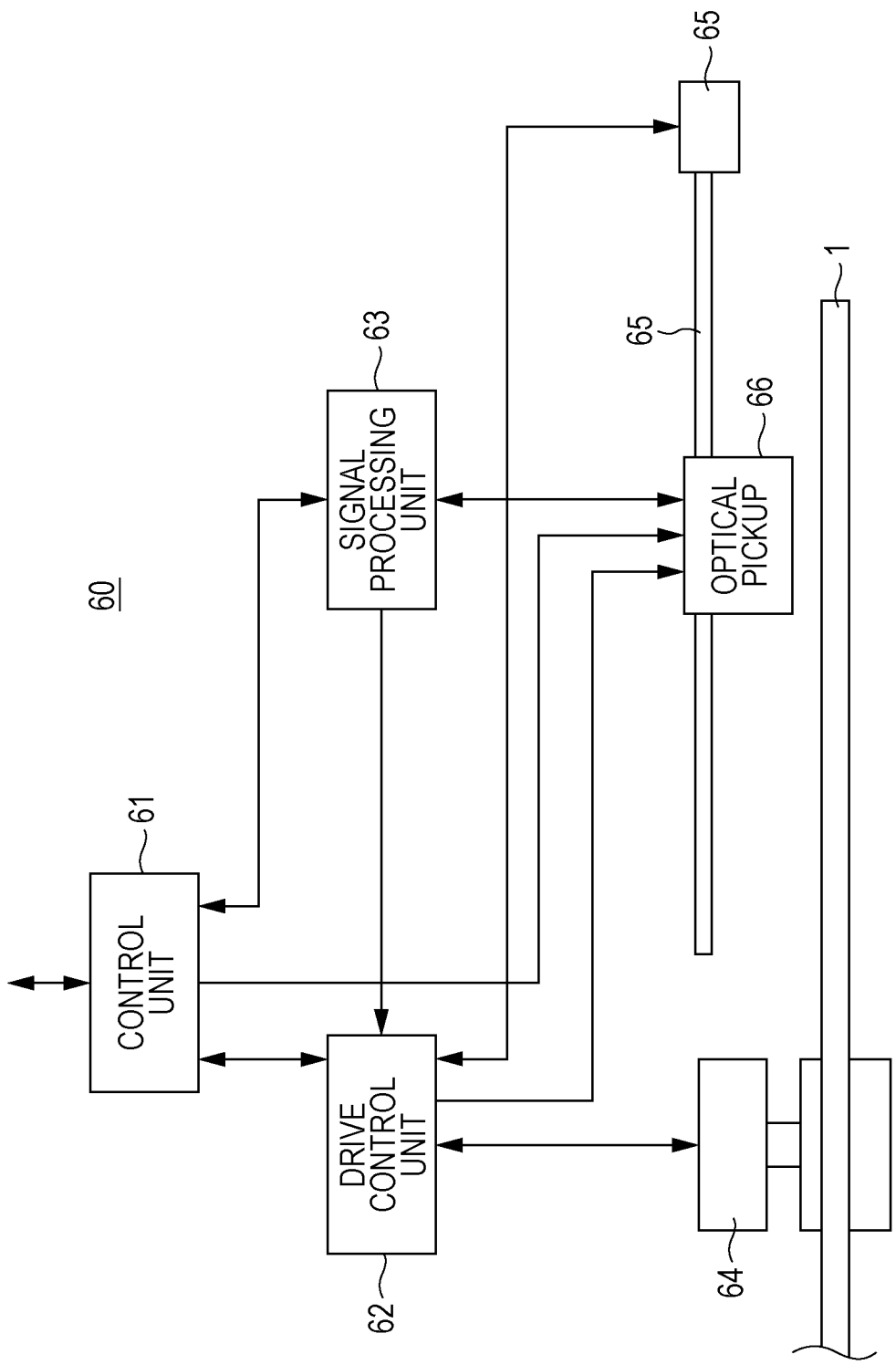
FIG. 7 is a block diagram illustrating a reproducing apparatus according to the embodiment.
Figure 8:
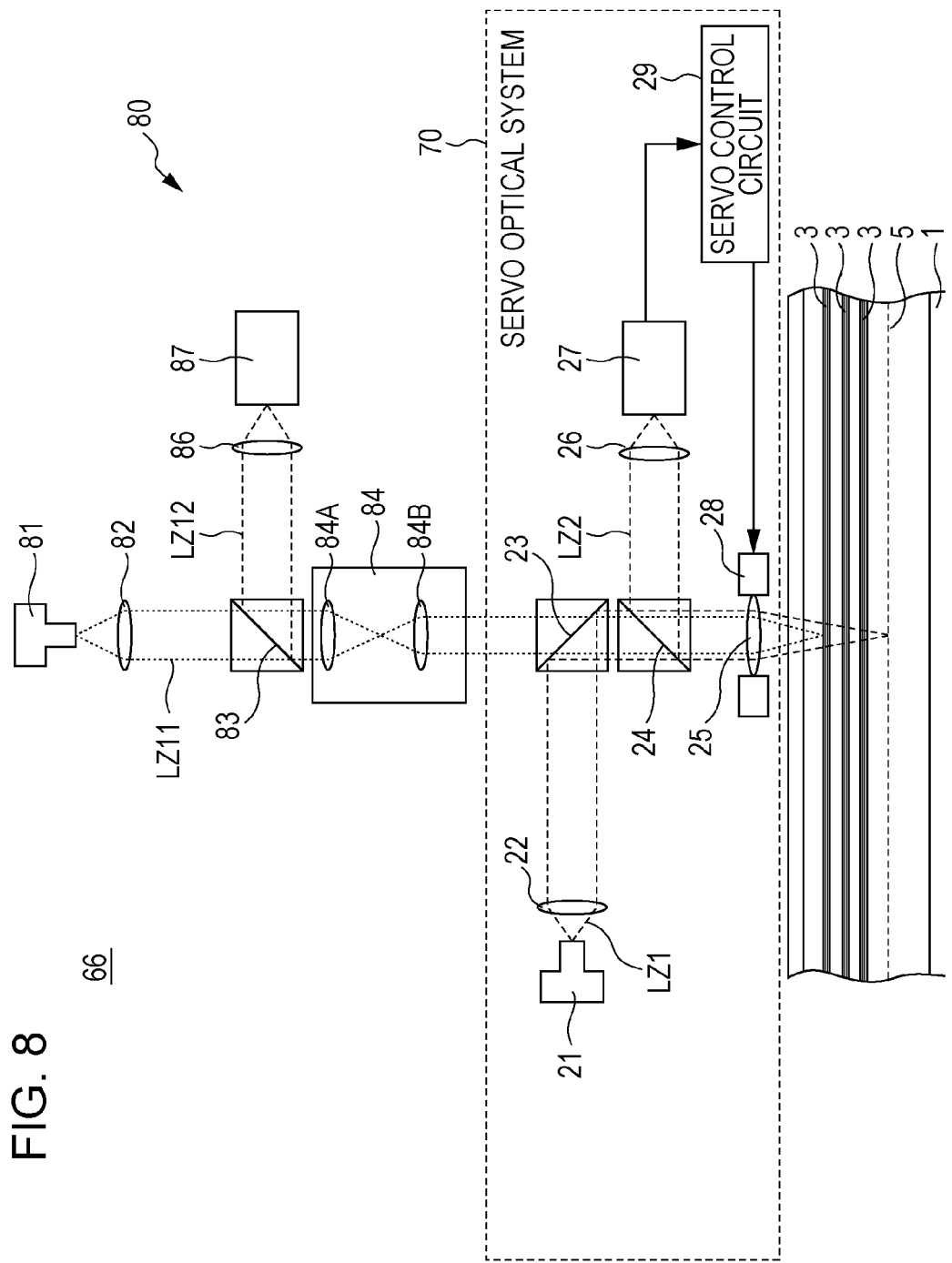
FIG. 8 is a block diagram illustrating an optical system of the reproducing apparatus according to the embodiment.

FIGS. 7 and 8 show the structure of a recording-reproducing apparatus according to the embodiment for performing recording or reproducing on the hologram disc 1 in this example.

FIG. 7 shows the entire structure of the recording-reproducing apparatus 60 according to the embodiment. The recording-reproducing apparatus 60 is assumed to be used for home users to record information in or reproduce information from the hologram disc 1 having recording layers 3 in which interference fringes are formed.

As shown in FIG. 7, the recording-reproducing apparatus 60 includes a control unit 61, a drive control unit 62, a signal processing unit 63, a spindle motor 64, a thread motor 65, and an optical pickup 66.

The control unit 61 totally controls the entire recording-reproducing apparatus 60.

The control unit 61 has a CPU (central processing unit), which is not shown, as a main unit, reads programs such as operating system program and information recording programs, from a ROM (read only memory), which is not shown, and loads these programs in a RAM (random access memory), which is not shown to execute various processes such as information processing.

The drive control unit 62 processes signals to be supplied or generates supply signals to be supplied to an actuator, which will be described later.

The drive control unit 62 also executes various drive control processes.

The signal processing unit 63 executes signal processing such as encoding, decoding, modulation, and demodulation.

The spindle motor 64 rotatably drives the hologram disc 1 under control of the drive control unit 62.

The optical pickup 66 performs laser output based on a recording signal supplied from the drive control unit 62 to perform recording on the hologram disc 1. During reproduction, the optical pickup 66 detects information of laser light reflected by the hologram disc 1.

The thread motor 65 moves the optical pickup 66 slidably on a movement axis 65. That is, the optical pickup 66 is slidable in the radius direction of the hologram disc 1.

The optical pickup 66 can focus laser light at a desired position through position control such as focus control and tracking control under control of the drive control unit 62.

The direction approaching or moving away from the hologram disc 1 is called the focus direction. The radial direction (direction toward the inner or outer circumference) of the hologram disc 1 is called the tracking direction.

During recording, when, for example, the control unit 61 receives, from an external device etc. (not shown), an information recording command, the information to be recorded, and the address at which the information is recorded in the state where the hologram disc 1 is loaded, the control unit 61 supplies a driving command to the drive control unit 62 according to the information recording program etc.

The drive control unit 62 controllably drives the spindle motor 64 according to the driving command to rotate the hologram disc 1 so that, for example, its linear velocity is constant. The drive control unit 62 controllably drives the thread motor 65 according to the driving command to move the optical pickup 66 along the movement axis 65.

The signal processing unit 63 applies a predetermined process such as encoding or modulation to information to be recorded in order to generate a recording signal indicated by codes 0 and 1. The drive control unit 62 generates a laser driving signal based on the recording signal supplied by the signal processing unit 63 and supplies the laser driving signal to the optical pickup 66.

The optical pickup 66 irradiates one side of the hologram disc 1 with a light beam based on the recording signal to while performing focus control and tracking control, which is described later, and forms a row of marks based on the recording signal to record information.

During reproduction, when, for example, the control unit 61 receives, from an external device etc. (not shown), an information reproducing command and the address at which the information is reproduced in the state where the hologram disc 1 is loaded, the control unit 61 supplies a driving command to the drive control unit 62 according to the information reproducing program etc.

The drive control unit 62 controllably drives the spindle motor 64 according to the driving command to rotate the hologram disc 1 so that, for example, its linear velocity is constant. The drive control unit 62 controllably drives the thread motor 65 according to the driving command to move the optical pickup 66 along the movement axis 65.

The drive control unit 62 lets the optical pickup 66 irradiate one side of the hologram disc 1 with a light beam while performing focus control and tracking control. Information of detection of the light reflected is supplied to the signal processing unit 63 and data recorded in the hologram disc 1 is reproduced by binarization, decoding, error correction, etc.

As described above, the recording-reproducing apparatus 60 records information in the initialized hologram disc 1 while performing position control such as focus control and tracking control or reproduces information from the hologram disc 1 in which the information is recorded.

The structure of the optical pickup 66 will be described below. The optical pickup 66 irradiates one side of the hologram disc 1 with a light beam (recording-reproducing light) as schematically shown in FIG. 8.

The hologram disc 1 has recording layers 3 in which interference fringes are formed by the above preformatting.

In FIG. 8, a reference plane 5 used to obtain the reference for servo control is indicated by a dashed line. The reference plane 5 is a focus servo reference plane and has spiral or concentric grooves (or a row of pits) used as a tracking guide.

The optical pickup 66 mainly has a servo optical system 70 and a recording-reproducing optical system 80.

The servo optical system 70 irradiates the hologram disc 1 with servo light LZ1 or receives reflected servo light LZ2 obtained as a result of reflection of the servo light LZ1 from the hologram disc 1.

A servo laser 21 of the servo optical system 70 is a semiconductor laser, for example. The servo laser 21 emits the servo light LZ1 of a predetermined amount of light including diverging light under control of the control unit 61 in FIG. 7. The servo light LZ1 is converted from diverging light to parallel light by a collimator lens 22 and enters a beam splitter 23.

The beam splitter 23 has a wavelength selectivity (dichroic characteristic) in which the reflection coefficient depends on the wavelength of a light beam and the beam splitter 23 reflects substantially 100% of servo light with, for example, the wavelength λs. If the wavelength of recording-reproducing light LZ11 output by a recording-reproducing laser 81, which will be described later, is λr, then substantially 100% of light with the wavelength λr passes through the beam splitter 23. The wavelength λs of the servo light LZ1 is longer than the wavelength λr of the recording-reproducing light LZ11. As an example, the wavelength λs of the servo light LZ1 is 650 nm and the wavelength λr of the recording-reproducing light LZ11 is 405 nm.

The servo light LZ1 reflected by the beam splitter 23 enters the next beam splitter 24. The beam splitter 24 allows approximately 50% of the servo light LZ1 to pass through and reflects the remaining part.

The servo light LZ1 that passed through the beam splitter 24 is focused on by an objective lens 25 and irradiates one side of the hologram disc 1. At this time, the servo light LZ1 is focused on the reference plane 5 of the hologram disc 1 and reflected by the reference plane 5.

The reflected servo light LZ2 reflected by the reference plane 5 becomes diverging light because the servo light LZ1 is convergent light, is converted to parallel light by the objective lens 25, and enters the beam splitter 24. Then, the reflected servo light LZ2 is reflected by the beam splitter 24 by approximately 50% and enters a focusing lens 26.

The focusing lens 26 lets the reflected servo light LZ2 converge and irradiates a photo detector 27 with the servo light LZ2.

The photo detector 27 has a detection area for obtaining a focus error signal in the non-point-focusing method or a tracking error signal in the push-pull method, and supplies a photoelectric conversion signal for the detection area to a servo control circuit 29.

The servo control circuit 29 generates the focus error signal and the tracking error signal using the photoelectric conversion signal from the photo detector 27 and supplies a focus servo driving signal and a tracking servo driving signal to an actuator 28 based on these signals.

The actuator 28 is disposed between a lens holder (not shown) that holds the objective lens 25 and the optical pickup 16 and drives the objective lens 25 in the focus direction based on a focus driving signal.

The actuator 28 also drives the objective lens 25 in the tracking direction based on a tracking driving signal.

With this, the feedback control of the objective lens 25 is performed so that the servo light LZ1 is focused in a groove (reference target track) in the reference plane 5 of the hologram disc 1.

When the groove in the reference plane 5 is wobbled on the basis of address information or address information is recorded as a row of pits etc., the servo control circuit 29 can extract address information from detection information of the reflected servo light LZ2 and supply it to the control unit 61 etc. in FIG. 7. For example, during recording, the address information can be used to perform recording operation.

During reproduction, it is possible to use address information read together with record data from a row of marks formed in the recording layers 3, in addition to the address information from the reference plane 5.

The recording-reproducing optical system 80 irradiates one side of the hologram disc 1 with the recording-reproducing light LZ11 or detects the reflected recording-reproducing light LZ12.

The recording-reproducing laser 81 of the recording-reproducing optical system 80 is, for example, a semiconductor laser and emits laser light with the wavelength λr. When recording information in the hologram disc 1, the recording-reproducing laser 81 emits the recording-reproducing light LZ11 including diverging light with relatively high strength under control of the control unit 61 (FIG. 7) and lets the recording-reproducing light LZ11 enter a collimator lens 82.

The collimator lens 82 converts the recording-reproducing light LZ11 from diverging light to parallel light and lets it enter a beam splitter 83. The beam splitter 83 allows a predetermined ratio of the recording-reproducing light LZ11 to pass through and lets the light enter a relay lens 84.

In the relay lens 84, a movable lens 84A converts the recording-reproducing light LZ11 from parallel light to convergent light or diverging light and a fixed lens 84B changes the convergent state of the recording-reproducing light LZ11 and lets it enter the beam splitter 23.

The beam splitter 23 allows the recording-reproducing light LZ11 with the wavelength λr to pass through and lets the light enter the beam splitter 24. The beam splitter 24 allows a predetermined ratio of the recording-reproducing light LZ11 to pass through and lets the light enter the objective lens 25. The objective lens 25 focuses the recording-reproducing light LZ11 and irradiates the hologram disc 1 with the light.

The position of the focal point of the recording-reproducing light LZ11 is determined by the convergent state assumed during output from the fixed lens 84B of the relay lens 84. Accordingly, the focal point of the recording-reproducing light LZ11 is located in the depth position of a certain recording layer 3 (one of layers L0 to Ln in FIG. 1B) that depends on the position of the movable lens 84A under control of the control unit 61.

That is, in the state where the focus control of the objective lens 25 is performed so that the servo light LZ1 is focused on the reference plane 5, the recording-reproducing light LZ11 is focused at the position shifted by the a predetermined offset from the servo light LZ1 in the depth direction of the hologram disc 1.

Accordingly, under control of the movable lens 84A, the focus control of the recording-reproducing light LZ11 in any one of the recording layers 3 can be performed.

During recording, the recording-reproducing light LZ11 is focused on a certain recording layer 3 to perform mark recording. The convergence of energy such as light energy and thermal energy of the recording-reproducing light LZ11 at the position of the focal point thermally or photochemically damages or changes interference fringes in the vicinity of the position of the focal point, thereby forming recording marks that have lost hologram characteristics (or degraded) locally.

Accordingly, the recording-reproducing apparatus 60 outputs the recording-reproducing light LZ11 that has been modulated on the basis of a recording signal that has performed predetermined modulation for information to be recorded using the signal processing unit 63, so that a row of marks based on a recording signal can be formed.

During recording in which no row of marks is formed, tracking control by the reflected servo light LZ2, which is described above, is performed. Accordingly, in a two-dimensional view, a row of marks formed in the recording layer 3 can be spiral or concentric along spiral or concentric grooves (or a row of pits) formed in the reference plane 5.

As described above, the position (focus position) at which the recording-reproducing light LZ11 is focused can be controlled by the movable lens 84A. Accordingly, changing the depth position that becomes the focus position forms a row of marks in each of the recording layers 3 (layers L0 to Ln). That is, mark recording across a plurality of layers is enabled.

On the other hand, when information is reproduced from the hologram disc 1, the control unit 61 lets the recording-reproducing laser 81 emit the recording-reproducing light LZ11 with relatively high strength.

By controlling the movable lens 84A, the focus position of the recording-reproducing light LZ11 is adjusted to the depth position equivalent to a predetermined recording layer 3 to be reproduced.

With this, the recording layer 3 to be reproduced is irradiated with the recording-reproducing light LZ11. At this time, the reflected recording-reproducing light LZ12 having reflected light components corresponding to the presence or absence of marks is obtained as light reflected by the recording layer 3.

The reflected recording-reproducing light LZ12 follows the optical path of the recording-reproducing light LZ11 in the opposite direction. That is, the reflected recording-reproducing light LZ12 passes through the objective lens 25, the beam splitter 24, the beam splitter 23, and the relay lens 84 sequentially and enters the beam splitter 83.

The beam splitter 83 reflects a part of the reflected recording-reproducing light LZ12 and lets the reflected light enter a focusing lens 86. The focusing lens 86 lets the reflected recording-reproducing light LZ12 converge and irradiates a photo detector 87 with the light.

The photo detector 87 receives the reflected recording-reproducing light LZ12 and generates an electronic signal (reproducing signal) depending on the amount of detected light. Then, the photo detector 87 sends the electric signal to the signal processing unit 63 shown in FIG. 7.

The signal processing unit 63 performs the binarization, decoding, error correction, and other processes of the reproducing signal from the photo detector 87 to reproduce information recorded in the hologram disc 1, and supplies the reproduced information to the control unit 61.

The control unit 61 sends the reproduced information to an external device accordingly.

As described above, when recording information in the hologram disc 1, the recording-reproducing apparatus 60 breaks (changes) or maintains the initial hologram depending on the information to be recorded. When reproducing information from the hologram disc 1, the recording and reproducing apparatus 60 detects the light (reflected recording-reproducing light LZ12) reflected by a row of marks on which the recording-reproducing light LZ11 is focused, and reproduces information based on the detection results.

The recording-reproducing apparatus 60 is used in this embodiment, but a reproducing apparatus with no recording function can also be achieved by substantially the same structure.

<3. Thickness of Recording Layer>

In the above description, the thickness d of the recording layer 3 is set to meet $8P_F \leq d \leq 30P_F$, more preferably $8P_F \leq d \leq 22P_F$ where $P_F$ represents the pitch of interference fringes. This will be described below.

In order to determine the optimum thickness of the recording layer 3, hologram discs 1 each having a different thickness were used to calculate the level of the reproducing signal.

Figure 10:
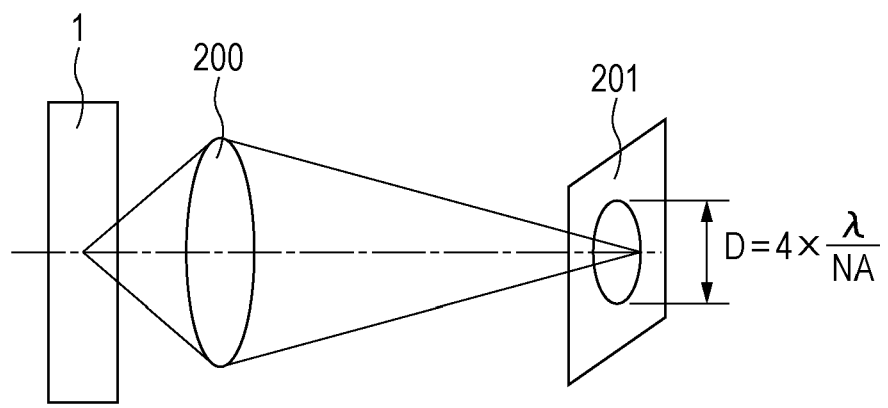
FIG. 10 illustrates a reproducing system according to the embodiment during measurement.

The detecting system in the consideration is used after light passes through a pin hole 201 as schematically shown in FIG. 10, the diameter D of the pin hole 201 is represented by $4\lambda/NA$ where NA is the numerical aperture of a focusing system 200. The focusing system 200 is, for example, an optical system for the reflected recording-reproducing light LZ12 in the recording-reproducing apparatus 60 as shown in FIG. 8. The focusing system 200 performs detection using the photo detector 87 after light passes through the pin hole 201.

A row of marks (1T=112 nm) were assumed to be formed at a track pitch $T_p$ of 0.36 μm on the basis of a recording signal by (1,7)RLL (run length limited) modulation in the hologram disc 1.

The NA of the objective lens 25 was assumed to be 0.85 and the reproducing light wavelength $\lambda r$ was assumed to be 405 nm.

Figure 9A:
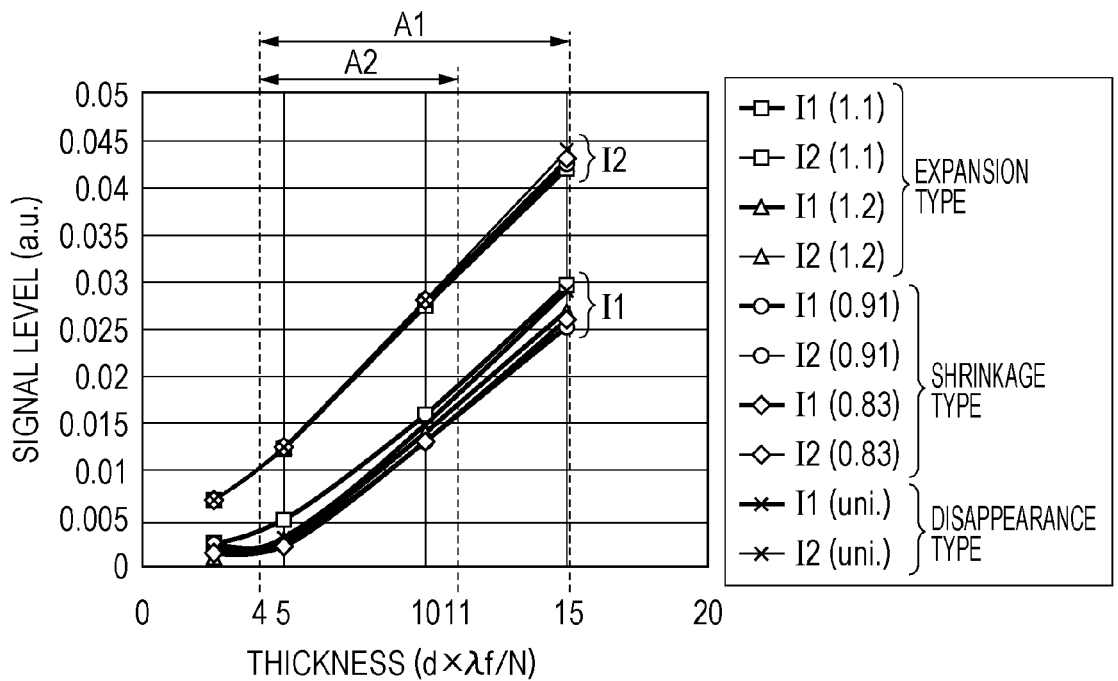
FIGS. 9A and 9B illustrate the results of measurement of I1 and I2 levels according to the embodiment.

FIG. 9A indicates the reproducing signal levels (bottom level I1 and peak level I2) when using the recording layers 3 each having a difference thickness.

Figure 9B:
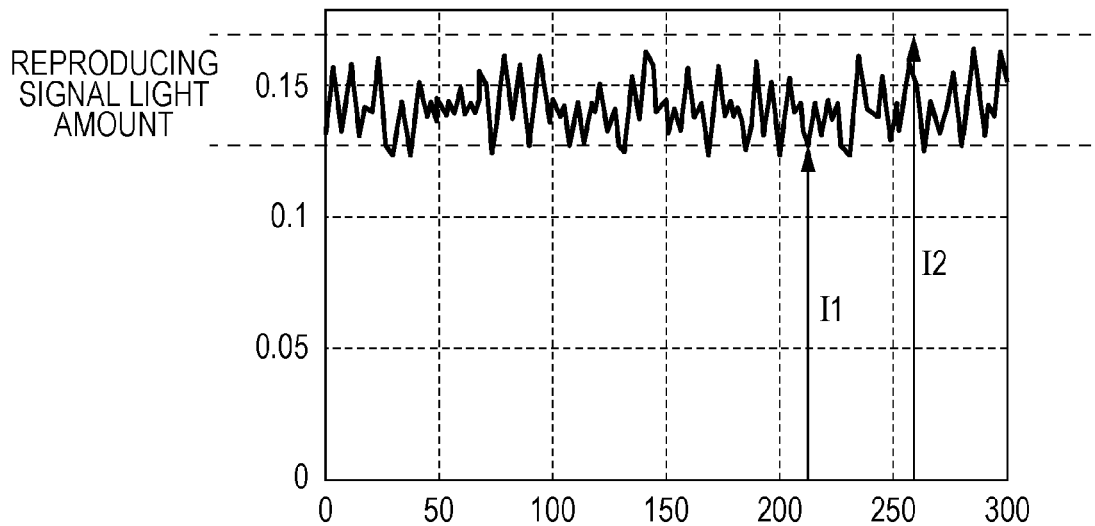

The bottom level I1 and peak level I2 are the bottom level and peal level in the reproducing signal waveform as shown in, for example, FIG. 9B, respectively.

The bottom level I1 can be considered as the level of a DC component because the DC component is added to the reproducing signal, and the peak level I2 to the bottom level I1 is the modulation depth.

The signal level indicating the peak level I2 and the bottom level I1 is plotted on the vertical axis in FIG. 9A.

The thickness of the recording layers 3 is plotted on the horizontal axis. The horizontal axis represents $d \cdot \lambda f/N$ where d represents the thickness. In the embodiment, the preformatting light wavelength $\lambda f$ is 405 nm, which is equal to the reproducing light wavelength $\lambda r$.

Measurement was performed in forming marks for each of the expansion, shrinkage, and disappearance types. For example, if the results of measurement are shown as I1 (1.1), I2 (1.1), then (1.1) indicates the value of $P_M/P_F$ where the interference fringe pitch after formation of marks is $P_M$ and the initial interference fringe pitch is $P_F$. Accordingly, a peak level I2 and bottom level I1 measurement result followed by (1.1) or (1.2) is of the expansion type in which marks are formed with interference fringes expanded.

A measurement result followed by (0.91) or (0.83) is of the shrinkage type in which marks are formed with interference fringes shrunk.

A measurement result followed by (uni.) is of the disappearance type in which marks are formed with interference fringes disappearing.

When the wavelength of preformatting light is $\lambda f$, the pitch $P_F$ of interference fringes formed during preformatting is $\lambda f/2N$ (N represents the refraction index of the material of the recording layer 3).

Accordingly, when value x on the horizontal axis in FIG. 9A is represented by the pitch $P_F$ of interference fringes, it is sufficient to use $(x \cdot \lambda/N)/(\lambda/2N)$. For example, a thickness of 5 on the horizontal axis is $10P_F$ and a thickness of 15 is $30P_F$.

It can be seen from the results in FIG. 9A that the signal level increases as the thickness of the recording layer 3 increases in any of the expansion, shrinkage, and disappearance types. The peak level I2 and the bottom level I1 are almost the same between the expansion, shrinkage, and disappearance types.

Since the bottom level I1 is equivalent to the DC level and a sufficient modulation depth (I2−I1) should be obtained, an appropriate range of thickness is determined.

Generally, the modulation depth (I2−I1) becomes smaller as the thickness of the recording layer 3 becomes thinner. In particular, when the value on the horizontal axis is less than 4, the modulation depth reduces.

On the other hand, the ratio of the modulation depth (I2−I1) to the DC component (bottom level I1) reduces as the thickness of the recording layer 3 increases. That is, as the thickness of the recording layer 3 increases, the S/N ratio degrades.

Accordingly, the range from 4 to 15 ($8P_F \leq d \leq 30P_F$), which is indicated by range A1, is appropriate as the thickness d of the recording layer 3.

When $8P_F \leq d$ is satisfied, there is little reduction in the modulation depth.

When $d \leq 30P_F$ is satisfied, $(I2-I1)/\{(I2+I1)/2\} > 0.5$ holds. This means the range in which the modulation depth is equal to or more than half the average amplitude level of the reproducing signal, which is an indicator of a good S/N ratio.

Accordingly, an appropriate range of the thickness d of the recording layer 3 is $8P_F \leq d \leq 30P_F$.

In addition, the range from 4 to 11, which is indicated by range A2 ($8P_F \leq d \leq 22P_F$), is more appropriate as the thickness d of the recording layer 3.

When $8P_F \leq d$ is satisfied, there is little reduction in the modulation depth as described above.

Next, $d \leq 22P_F$ is determined by the condition $(I2-I1) \geq I1$. This condition means that the modulation is equal to or more than the DC level. This condition improves the S/N ratio of the reproducing signal.

In addition, for a thickness of $22P_F$ or less, the thickness efficiency of the recording layer 3 with respect to a mark to be formed is appropriate.

FIG. 5 shows marks formed when the thickness d takes different thicknesses. It can be seen in the drawing that the thickness of the recording layer 3 in which interference fringes were formed is redundantly larger with respect to the vertical length of a recording mark when the thickness d is $30P_F$. That is, the thickness of one recording layer 3 is redundant. On the other hand, when the thickness d is $20P_F$, the redundancy is not so much. Redundancy of the thickness affects the number of recording layers that can be formed in the hologram disc 1 for which the entire thickness is set to a predetermined thickness. Accordingly, it is better to reduce the thickness.

In consideration of this point and the above condition $(I2-I1) \geq I1$, the condition $d \leq 22P_F$ is more appropriate.

As described above, in the embodiment, it is possible to obtain a reproducing signal of high quality by setting the thickness of the recording layer 3 to a value in the above range.

<4. Hologram Disc According to Another Embodiment>

A hologram disc 1 according to another embodiment will be described below. The hologram disc 1 according to the other embodiment has the same structure as that in FIGS. 1A and 1B, but the hologram pitch of marks to be recorded is constant.

In the embodiment described first, the preformatting light wavelength λf is equal to the reproducing light wavelength λr and the pitch of interference fringes in the preformatted state is λf/2N, which is equal to λr/2N represented by the reproducing light wavelength λr. Accordingly, Bragg match occurs in a section where no marks are formed (section where initial interference fringes remain) during reproduction and Bragg mismatch occurs in a marked section. As a result, the reproducing signal obtained in the marked section during irradiation with reproducing light differs from that obtained in the non-marked section.

Alternatively, Bragg match may occur in the marked section and Bragg mismatch may occur in the non-marked section with respect to the reproducing light. In the other embodiment, this situation is achieved and the preformatting light wavelength λf is different from the reproducing light wavelength λr. In addition, the interference fringe pitch $P_M$ in the marked section is equal to λr/2N.

Figure 11A:
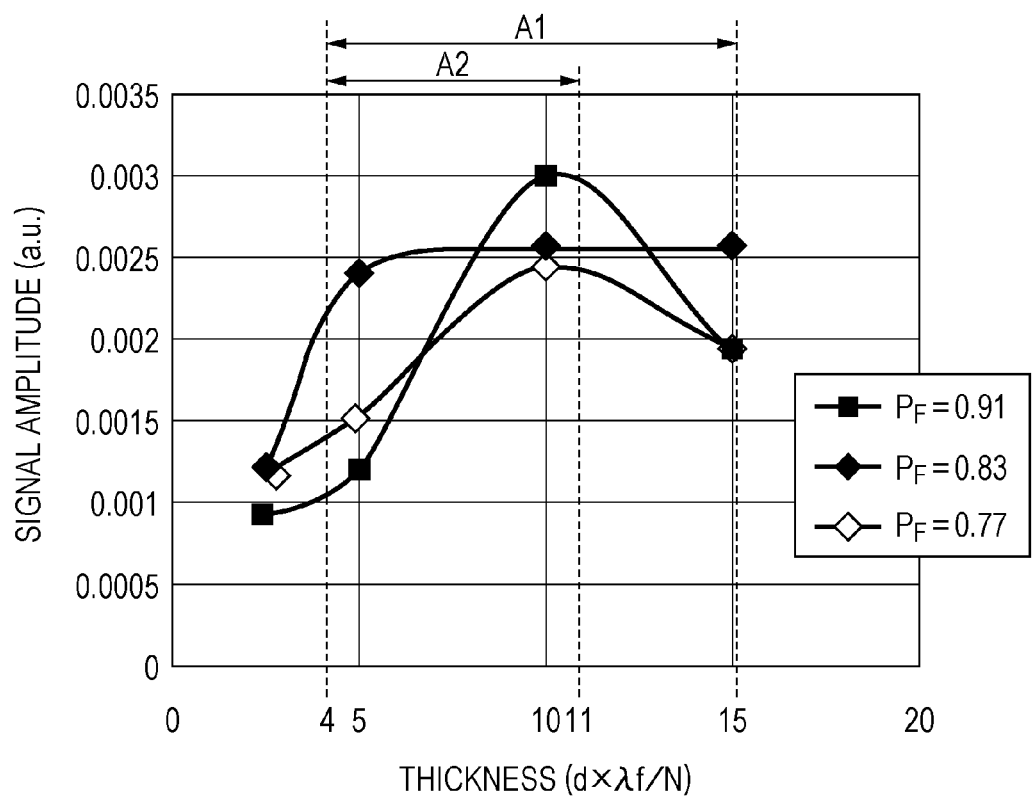
FIGS. 11A and 11B illustrate the results of measurement of the amplitude of a reproducing signal according to another embodiment.

FIG. 11A shows the signal amplitude level with respect to the thickness of the recording layer 3 when the preformatting light wavelength λf is the reproducing light wavelength λr multiplied by 0.91, multiplied by 0.83, and multiplied by 0.77.

Figure 11B:
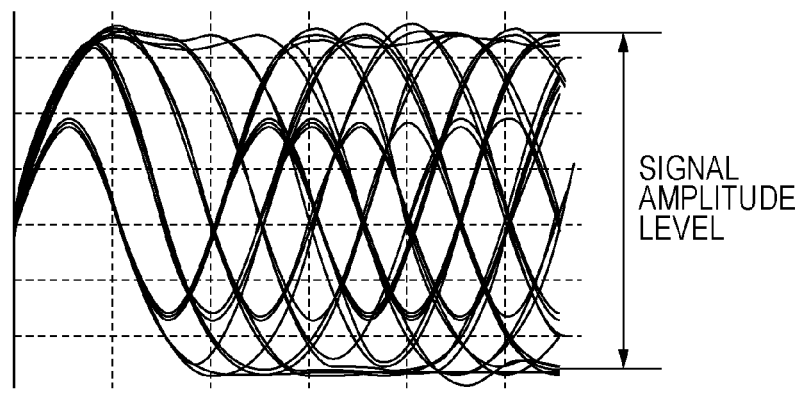

The signal amplitude level on the vertical axis ranges from the peak level to the bottom level as shown in FIG. 11B.

In the other embodiment, since Bragg mismatch may occur in the non-marked section, there is little DC light components. Accordingly, the signal amplitude level can be assumed to be equivalent to the modulation depth.

The horizontal axis in FIG. 11A represents $d \cdot \lambda f/N$ as in FIG. 9A where d is the thickness of the recording layer 3. The detecting system is the same as that shown in FIG. 10.

Figure 12:
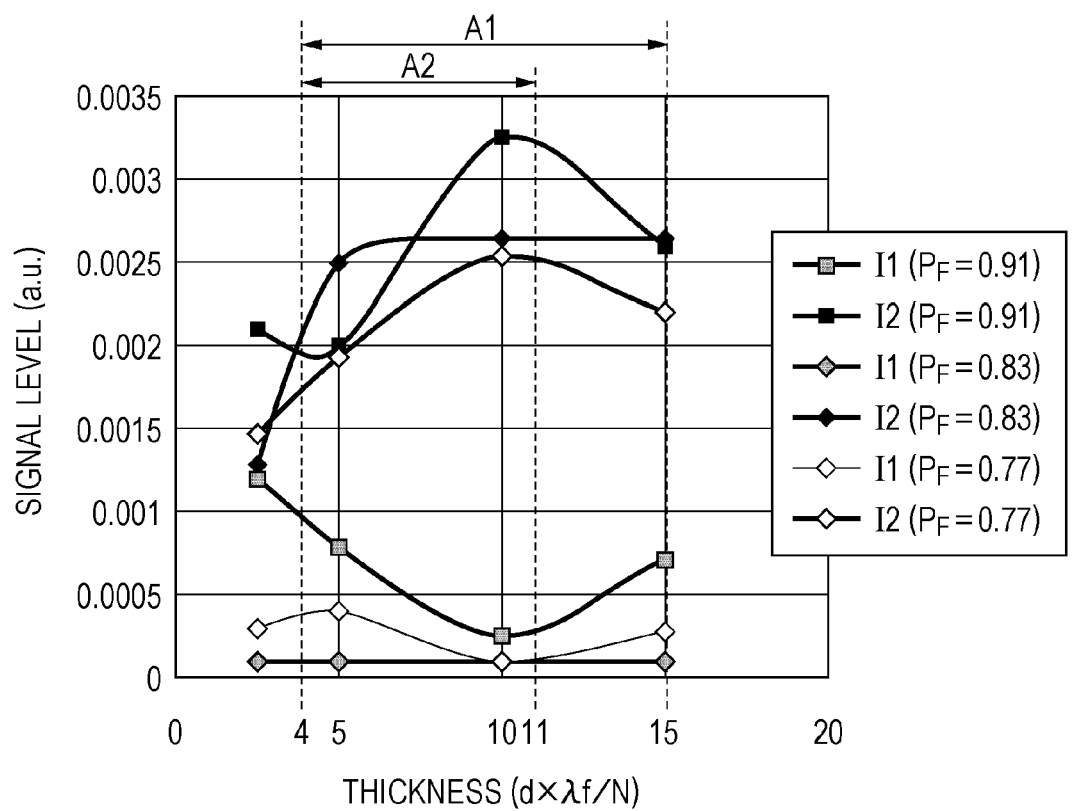
FIG. 12 illustrates the results of measurement of I1 and I2 levels according to the other embodiment.

FIG. 12 shows the peak level I2 and bottom level I1, which correspond to those in FIG. 11A.

It can be seen in FIGS. 11A and 12 that the thickness d of the recording layer 3 is appropriate because a certain level of modulation depth is obtained if the thickness d falls within the range from 4 to 15 ($8P_F \leq d \leq 30P_F$), which is indicated by range A1, and the range from 4 to 11 ($8P_F \leq d \leq 22P_F$) even when the preformatting light wavelength λf is different from the reproducing light wavelength λr.

<5. Hologram Disc According to Still Another Embodiment>

A hologram disc 1 according to still another embodiment will be described with reference to FIGS. 13A to 13C.

FIG. 13A shows the hologram disc 1 before being initialized; FIG. 13B shows the hologram disc 1 after being initialized.

The hologram disc 1 according to the still other embodiment is the same as in the embodiments described first and second in that the hologram disc 1 has the recording layer formation region 10 in which photosensitive layers and nonphotosensitive layers are laminated, but the hologram disc 1 is different in that one photosensitive layer includes a plurality of recording layers each having interference fringes in a part in its thickness direction.

As shown in FIG. 13A, the hologram disc 1 has the recording layer formation region 10 in which nonphotosensitive layers (intermediate layers 4) and photosensitive layers 7 are laminated alternately on the disc substrate 6. The side on which laser light is incident is the cover layer 2.

The cover layer 2 has a thickness of approximately 50 μm, for example.

The intermediate layer 4 (nonphotosensitive layer) has a thickness of approximately 5 to 15 μm.

The photosensitive layer 7 (uninitialized photosensitive layer on which no recording layer is formed) has a thickness of 30 μm, for example.

In the hologram disc 1 of this type, two recording layers 3 are formed in each of the photosensitive layers 7 by preformatting, as shown in FIG. 13B. That is, interference fringes are formed partially in each of the photosensitive layers 7 and the section including the interference fringes becomes the recording layer 3.

For example, in the photosensitive layer 7, the section including interference fringes is formed in the part in contact with the upper nonphotosensitive layer (the intermediate layer 4 or the cover layer 2) and the part in contact with the lower nonphotosensitive layer, and the sections including interference fringes become the recording layers 3.

FIG. 13C shows an example of marks formed by deformation of interference fringes in the recording layer 3. In this case, marks are formed by the expansion, shrinkage, or disappearance of interference fringes as the recording layer 3.

As in the embodiment described first, the thickness d of the recording layer 3 is set to meet $8P_F \leq d \leq 30P_F$, more preferably $8P_F \leq d \leq 22P_F$ where $P_F$ represents the pitch of interference fringes.

In the hologram disc 1 of this type, a reproducing signal with a favorable S/N ratio is obtained, as in the embodiment described first.

Although one photosensitive layer has one recording layer 3 in the embodiment described first, one photosensitive layer 7 has a plurality of recording layers 3 in this embodiment. Accordingly, the thickness of one photosensitive layer 7 increases during lamination, but the number of laminations can be reduced by adoption of a lamination structure for obtaining a desired number of recording layers. This improves the efficiency of a disc manufacturing process.

The reduction in the number of laminations also has an advantage of reducing unnecessary reflection on the interface between the recording layer 3 and the intermediate layer 4.

Figure 14:
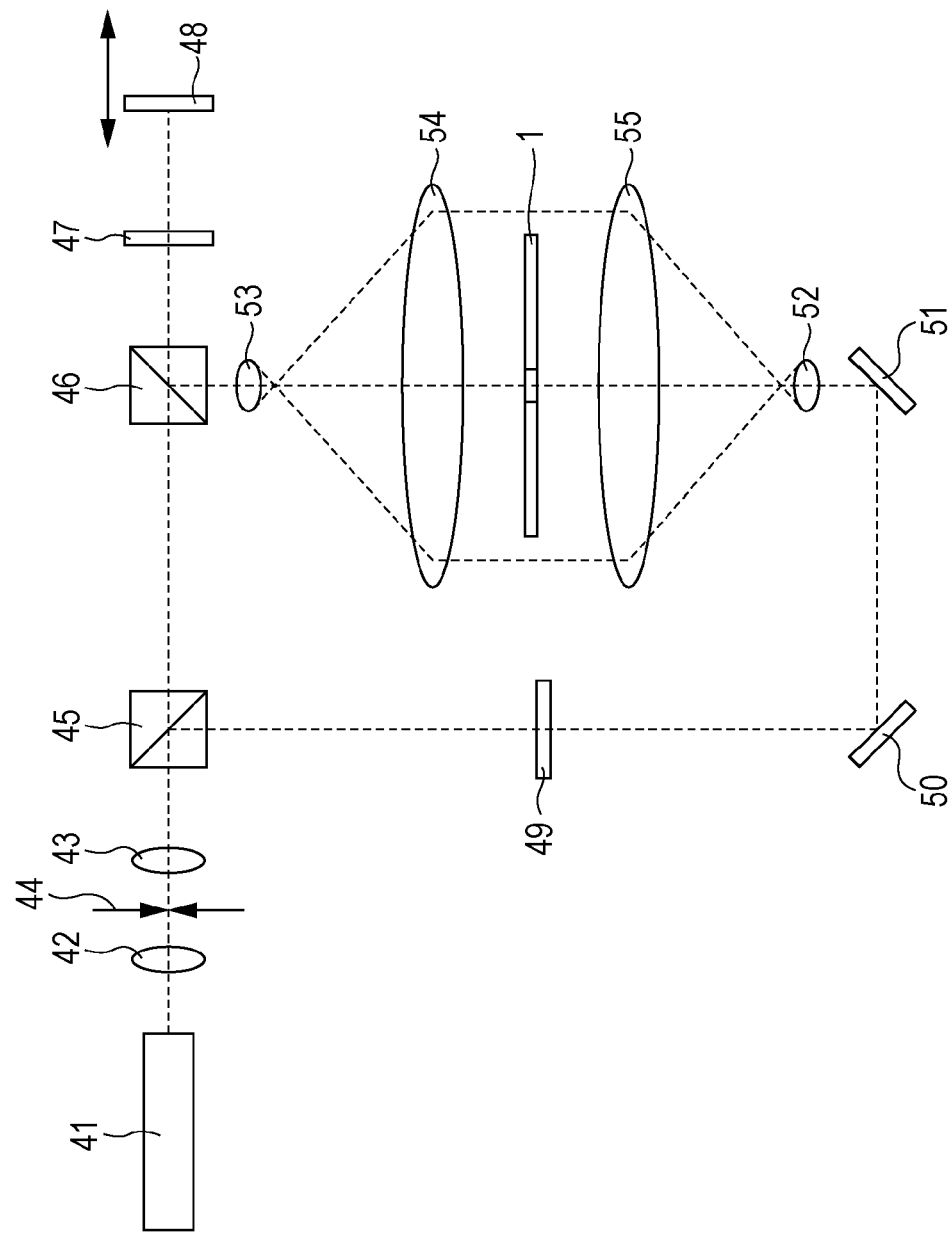
FIG. 14 illustrates a preformatting apparatus for the hologram disc according to the still other embodiment.

Preformatting for forming the section including interference fringes (recording layer 3) in the photosensitive layer 7 as shown in FIG. 13B can be performed by, for example, the preformatting apparatus shown in FIG. 14.

A laser light source 41 outputs preformatting light with the wavelength λf (for example, 405 nm). The coherency of the laser is 10 μm or less.

This preformatting light passes through a lens 42, a spatial filter 44, and a lens 43 and reaches a beam splitter 45. One light component dispersed by the beam splitter 45 passes through a polarizing beam splitter 46, a quarter wavelength plate 47, an adjusting mirror 48, the quarter wavelength plate 47, the polarizing beam splitter 46, and a lens 53 and its light diameter is enlarged by the lens 53 and a lens 54. One side of the hologram disc 1 is irradiated with parallel light of a plane wave obtained from the lens 54.

The other light component dispersed by the beam splitter 45 passes through a half wavelength plate 49, a mirror 50, and a mirror 51 and its light diameter is enlarged by lenses 52 and 55. The other side of the hologram disc 1 is irradiated with parallel light of a plane wave obtained from the lens 55.

In this type of structure, since the adjusting mirror 48 is movable in an optical axis direction, moving the adjusting mirror 48 changes the depth at which interference fringes are formed.

Accordingly, it is possible to manufacture the hologram disc 1 in this example shown in FIG. 13B by forming interference fringes in sequence while controlling the adjusting mirror 48 according to the positions in which the recording layers 3 are formed in the photosensitive layers 7 in FIG. 13A.

In the hologram disc 1 according to the still other embodiment, information can be recorded and reproduced by the recording-reproducing apparatus described in FIGS. 7 and 8.

While the embodiments have been described above, the present application is not restricted to the examples in the embodiments and various modifications can be considered.

The layer structure of the recording medium is not restricted to the ones shown in FIG. 1B and FIGS. 13A to 13C. The recording medium should only have the recording layer formation region in which at least the photosensitive layer and the nonphotosensitive layer are laminated and the recording layer includes interference fringes formed in the photosensitive layer.

As described above, the hologram disc 1 or recording medium according to the embodiments of the present application reproduces information based on a change in the amount of light that depends on the difference in the refraction index between a marked section and a non-marked section (in the initial state), but it can reproduce information recorded as so-called homodyne detection. For example, interference fringes expanded to become marks, thereby causing a phase difference between a marked section and a non-marked section in reflected light during irradiation with reproducing light. This phase difference can be detected to obtain reproduction information.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A recording medium comprising:
a photosensitive layer;
a nonphotosensitive layer; and
a recording layer formation region in which the photosensitive layer and the nonphotosensitive layer are laminated;
wherein the photosensitive layer includes a recording layer in which interference fringes formed in parallel with a recording medium surface are deleted or changed within a portion irradiated with focused light to record information or light reflected during irradiation with focused light is used to reproduce information, and
wherein the recording layer has a thickness equal to or more than 8PF and equal to or less than 30PF where PF represents the pitch of the interference fringes.

2. The recording medium of claim 1, wherein the recording layer has a thickness equal to or more than 8PF and equal to or less than 22PF.

3. The recording medium of claim 1, wherein the recording layer in which the interference fringes are formed extends entirely in a thickness direction of the photosensitive layer.

4. The recording medium of claim 1, wherein the photosensitive layer includes a plurality of the recording layers in which the interference fringes are formed partly in a thickness direction of the photosensitive layer.

5. The recording medium of claim 1, further comprising a reference plane used for focus control or tracking control of light irradiating the recording layer during recording or reproduction.

6. A reproducing apparatus for a recording medium including
a photosensitive layer,
a nonphotosensitive layer, and
a recording layer formation region in which the photosensitive layer and the nonphotosensitive layer are laminated, wherein the photosensitive layer includes a recording layer in which interference fringes formed in parallel with a recording medium surface are deleted or changed within a portion irradiated with focused light to record information or light reflected during irradiation of focused light is used to reproduce information, the reproducing apparatus comprising:
an optical pickup that irradiates the recording layer with light and receives reflected light; and
a signal processing unit that reproduces information recorded in the recording layer based on information about the reflected light received by the optical pickup,
wherein the recording layer has a thickness equal to or more than 8PF and equal to or less than 30PF where PF represents the pitch of the interference fringes.

* * * * *